(12) United States Patent
Vargantwar et al.

(10) Patent No.: US 8,565,805 B1
(45) Date of Patent: Oct. 22, 2013

(54) METHOD AND SYSTEM OF SENDING POWER CONTROL COMMANDS

(75) Inventors: Sachin R. Vargantwar, Overland Park, KS (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 253 days.

(21) Appl. No.: 12/960,108

(22) Filed: Dec. 3, 2010

(51) Int. Cl.
*H04B 7/00* (2006.01)

(52) U.S. Cl.
USPC ....... 455/522; 455/13.4; 455/574; 455/115.1; 455/115.3; 455/69

(58) Field of Classification Search
None
See application file for complete search history.

(56) References Cited

U.S. PATENT DOCUMENTS

| | | | |
|---|---|---|---|
| 6,208,873 B1 | 3/2001 | Black et al. | |
| 6,256,301 B1 | 7/2001 | Tiedemann, Jr. et al. | |
| 6,594,499 B1 * | 7/2003 | Andersson et al. | 455/522 |
| 6,987,982 B2 | 1/2006 | Willenegger et al. | |
| 7,437,173 B2 * | 10/2008 | Lee et al. | 455/522 |
| 7,973,698 B1 * | 7/2011 | Woodell et al. | 342/26 B |
| 2004/0092233 A1 * | 5/2004 | Rudrapatna | 455/69 |
| 2005/0143113 A1 | 6/2005 | Lee et al. | |
| 2005/0153671 A1 | 7/2005 | Ichikawa | |
| 2007/0191044 A1 | 8/2007 | Kostic et al. | |
| 2008/0311864 A1 * | 12/2008 | Wallis | 455/115.1 |

FOREIGN PATENT DOCUMENTS

WO   WO 2010030212 A1 *  3/2010

\* cited by examiner

*Primary Examiner* — Fayyaz Alam
*Assistant Examiner* — Mohammed Rachedine

(57) ABSTRACT

While a first and second entity are engaging in a communication session on a wireless link, the first entity may be sending a series of power control commands (PCCs) directed to the second entity at a first transmission rate. Additionally, the first entity may monitor an actual and expected transmission-power adjustment of the second entity. Based on this monitored actual and expected transmission-power adjustment, the first entity may decide to alter the PCC transmission scheme for the second entity. For instance, if the monitored actual and expected transmission-power adjustment differs by a threshold extent, the power-controlling entity may decide to increase the PCC transmission rate for the power-controlled entity and/or increase the transmission-power adjustment instructed by PCCs directed to the second entity. In response, the first entity may begin sending the series of PCCs directed to the second entity according to the altered PCC transmission scheme.

16 Claims, 3 Drawing Sheets

METHOD AND SYSTEM OF SENDING POWER CONTROL COMMANDS

BACKGROUND

To provide cellular wireless communication service, a wireless service provider typically employs an access network that functions to connect one or more access terminals (e.g., cell phones, PDAs, laptops, netbooks, tablets, and/or other wirelessly-equipped devices) with one or more transport networks. In a typical access network, an area is divided geographically into a number of coverage areas, such as cells and sectors, each defined by a radio frequency (RF) radiation pattern from a respective base transceiver station (BTS). Within each coverage area, the BTS's RF radiation pattern may provide one or more wireless links, each on a carrier (or set of carriers), over which access terminals may communicate with the access network. In turn, the access network may provide connectivity with the public switched telephone network (PSTN), the Internet, and/or other transport networks.

The wireless links may carry communications between the access network and the access terminals according to any of a variety of wireless protocols. Depending on the protocol employed, each wireless link may also be divided into a plurality of channels for carrying communications between the access network and the access terminals. For example, each wireless link may include a plurality of forward-link channels, such as forward traffic channels, for carrying communications from the access network to the access terminals. As another example, each wireless link may include a plurality of reverse-link channels, such as reverse traffic channels, for carrying communications from the access terminals to the access network.

In many wireless protocols, the access network and active access terminals (i.e., access terminals with an assigned traffic channel) may engage in a power-control process to control transmission power for communications over the wireless links provided by the access network. In particular, the access network and an active access terminal may engage in a reverse power-control process to control the reverse transmission power at which the access terminal sends data on an established reverse traffic channel of a wireless link provided by the access network. Similarly, an active access terminal and the access network may engage in a forward power-control process to control the forward transmission power at which the access network sends data on an established forward traffic channel of a wireless link provided by the access network.

In an example power-control process, a power-controlling entity may regularly determine a channel quality at which a given wireless link is carrying a given communication session with the power-controlled entity. The power-controlling entity may then regularly compare the determined quality to a threshold quality and thereby decide whether to send a "power up" power control command (PCC) that instructs the power-controlled entity to increase its transmission power by a given increment value (e.g., 1 dB) for the given communication session on the given wireless link or a "power down" PCC that instructs the power-controlled entity to decrease its transmission power by a given decrement value (e.g., 1 dB) for the given communication session on the given wireless link. For instance, based on each comparison, the power-controlling entity may decide to send (a) a "power up" PCC directed to power-controlled entity if the determined quality is less than the threshold quality (which indicates that the power-controlling entity is detecting a lower quality) or (b) a "power down" PCC directed to power-controlled entity if the determined quality is greater than the threshold quality (which indicates that the power-controlling entity is detecting a higher quality). Accordingly, the power-controlling entity may send a series of PCCs directed to the power-controlled entity on the given wireless link.

As the power-controlling entity sends the series of PCCs directed to the power-controlled entity on the given wireless link, the power-controlled entity may receive the series of PCCs from the power-controlling entity. In response to each PCC received from the power-controlling entity, the power-controlled entity may then responsively adjust its transmission power for the given communication session on the given wireless link in accordance with the PCC. For instance, the power-controlled entity may increase its transmission power for the given communication session on the given wireless link in response to receiving a "power up" PCC from the power-controlling entity. And the power-controlled entity may decrease its transmission power for the given communication session on the given wireless link in response to receiving a "power down" PCC from the power-controlling entity. Accordingly, during this power-control process, the power-controlled entity may continually adjust its transmission power for the given communication session on the given wireless link.

Advantageously, such a power-control process may enable the access network and active access terminals to balance between maintaining an acceptable strength of a traffic-channel communication and preventing the traffic-channel communication from becoming overly strong and unduly interfering with other communications.

OVERVIEW

In some protocols, such as EIA/TIA/IS-2000 Rel. 0, Rel. A, or other versions thereof (hereafter "IS-2000"), a power-controlling entity may send a series of power control commands (PCCs) directed to a power-controlled entity at a predefined standard PCC transmission rate (e.g., 800 PCCs/second) on a given wireless link. Due to poor channel quality or other factors, however, the power-controlled entity may fail to receive some PCCs sent by the power-controlling entity (i.e., the PCC receipt rate of the power-controlled entity may be less than the PCC transmission rate of the power-controlling entity).

This failure to receive some PCCs sent by the power-controlling entity may in turn result in the power-controlled entity failing to adjust its transmission power in close enough alignment with the expectations of the power-controlled entity, which may lead to various negative consequences. For example, if the power-controlled entity fails to receive a number of "power up" PCCs from power-controlling entity—and thus fails to increase its transmission power accordingly—the power-controlled entity may be transmitting bearer data for the given communication session at an unexpectedly low power level that may degrade the quality of the given communication session. As another example, if power-controlled entity fails to receive a number of "power down" PCCs from the power-controlling entity—and thus fails to decrease its transmission power accordingly—the power-controlled entity may be transmitting bearer data for the given communication session at an unexpectedly high power level that may consume additional power at power-controlled entity and introduce additional interference on neighboring wireless links. Accordingly, a power-control process that reduces the likelihood of the power-controlled entity failing to adjust its transmission power in alignment with the expectations of the power-controlling entity is desirable.

Disclosed herein in such a power-control process. According to the disclosed power-control process, while sending the series of PCCs directed to the power-controlled entity at the standard PCC transmission rate on the given wireless link, the power-controlling entity may monitor both the actual transmission-power adjustment of the power-controlled entity (i.e., the transmission-power adjustments that are made by the power-controlled entity in accordance with received PCCs) and the expected transmission-power adjustment of the power-controlled entity (i.e., the transmission-power adjustments that should be made by the power-controlled entity in accordance with transmitted PCCs).

Based on the monitored actual and expected transmission-power adjustment of the power-controlled entity, the power-controlling entity may decide whether to alter a transmission scheme for sending PCCs to the power-controlled entity (i.e., a PCC transmission scheme for the power-controlled entity). In a first aspect, altering the PCC transmission scheme may take the form of altering the transmission rate at which to send PCCs to the power-controlled entity (i.e., the PCC transmission rate for the power-controlled entity). For instance, if the monitored actual and expected transmission-power adjustment differs by a threshold extent, the power-controlling entity may decide to increase the PCC transmission rate for the power-controlled entity. Alternatively, if the monitored actual and expected transmission-power adjustment does not differ by a threshold extent, the power-controlling entity may decide to decrease the PCC transmission rate for the power-controlled entity. In a second aspect, altering the PCC transmission scheme may take the form of altering the transmission-power adjustment instructed by PCCs directed to the power-controlled entity. For instance, if the monitored actual and expected transmission-power adjustment differs by a threshold extent, the power-controlling entity may decide to increase the transmission-power adjustment instructed by PCCs directed to the power-controlled entity. Alternatively, if the monitored actual and expected transmission-power adjustment does not differ by a threshold extent, the power-controlling entity may decide to decrease the transmission-power adjustment instructed by PCCs directed to the power-controlled entity. The power-controlling entity may implement these aspects of the exemplary power-control process together or separately.

In response to deciding to alter the PCC transmission scheme for the power-controlled entity, the power-controlling entity may then begin sending PCCs directed to the power-controlled entity according to the altered PCC transmission scheme. For example, the power-controlling entity may then begin sending PCCs directed to the power-controlled entity at an altered transmission rate. As another example, the power-controlling entity may then begin sending PCCs directed to the power-controlled entity that instruct an altered power-transmission adjustment. Other examples are possible as well.

Advantageously, the disclosed power-control process may enable the power-controlling entity to take corrective action (s) that bring the actual and expected transmission-power adjustment of the power-controlled entity in closer alignment, thus avoiding the negative consequences described above. For example, sending PCCs directed to the power-controlled entity at an increased transmission rate may increase the PCC receipt rate of the power-controlled entity and thereby achieve better synchronization between the actual and expected transmission-power adjustment of the power-controlled entity. As another example, sending PCCs directed to the power-controlled entity that instruct an increased power-transmission adjustment may enable the power-controlled entity to adjust its transmission power more quickly and thereby achieve better synchronization between the actual and expected transmission-power adjustment of the power-controlled entity. The disclosed power-control process may enable the power-controlling entity to conserve network resources when the actual and expected transmission power adjustment is closely aligned. Other benefits may exist as well.

The first aspect of the disclosed power-control process may take the form of an exemplary method that includes a first entity (e.g., an access network or entity thereof) (a) engaging in a given communication session with a second entity (e.g., an access terminal) on a given wireless link, (b) sending a series of PCCs directed to the second entity at a first transmission rate on the given wireless link, (c) monitoring an actual and expected transmission-power adjustment of the second entity, (d) based on the monitored actual and expected transmission-power adjustment, deciding to alter the transmission rate at which to send PCCs directed to the second entity from the first transmission rate to a second transmission rate, and (e) in response to deciding to alter the transmission rate at which to send PCCs directed to the second entity, sending the series of PCCs directed to the second entity at the second transmission rate.

The second aspect of the disclosed power-control process may take the form of an exemplary method that includes a first entity (e.g., an access network or entity thereof) (a) engaging in a given communication session with a second entity (e.g., an access terminal) on a given wireless link, (b) sending a series of PCCs directed to the second entity on the given wireless link, where each PCC instructs a transmission-power adjustment of a first value, (c) monitoring an actual and expected transmission-power adjustment of the second entity, (d) based on the monitored actual and expected transmission-power adjustment, deciding to alter the transmission-power adjustment instructed by PCCs directed to the second entity from the first value to a second value, and (e) in response to deciding to alter the transmission-power adjustment instructed by PCCs directed to the second entity, sending the series of PCCs directed to the second entity at the second transmission rate, where each PCC instructs a transmission-power adjustment of the second value.

Also disclosed herein is an exemplary base station that includes (a) a first communication interface configured to provide one or more wireless links over which to communicate with one or more access terminals, (b) a second communication interface configured to facilitate communication with one or more access network entities, (c) a processor, (d) data storage, and (e) program instructions stored in data storage and executable by the processor to carry out the features described herein. The base station may take other forms as well.

These as well as other aspects and advantages will become apparent to those of ordinary skill in the art by reading the following detailed description, with reference where appropriate to the accompanying drawings.

DETAILED DESCRIPTION

I. Communication System

Figure 1:
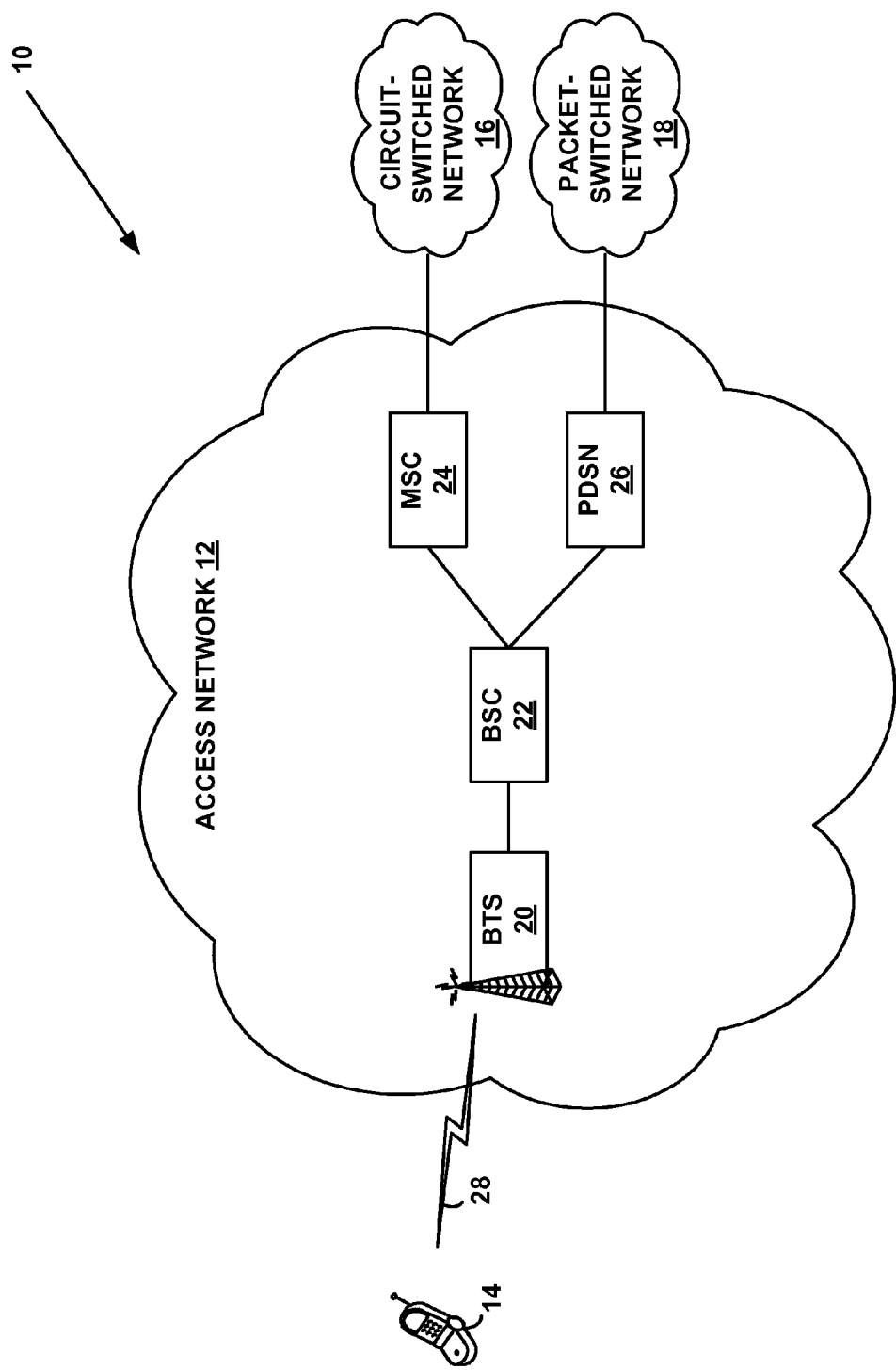
FIG. 1 is a simplified block diagram of a communication system in which a power-control process can be implemented.

FIG. 1 is a simplified block diagram of a communication system 10 in which an exemplary power-control process can be implemented. As shown, the system 10 may include an access network 12 that functions to provide connectivity between one or more access terminals, such as access terminal 14, and one or more transport networks, such as a circuit-switched network 16 (e.g., the Public Switched Telephone Network (PSTN)) and a packet-switched network 18 (e.g., the Internet).

It should be understood that the arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions written in any suitable programming language (e.g., C, C++, Java, etc.) and stored in memory.

As shown in FIG. 1, access network 12 may include one or more base transceiver stations (BTSs), such as BTS 20. (Although FIG. 1 depicts access network 12 as including one BTS, it should be understood that access network 12 may include more than one BTS.) BTS 20 may be any entity that facilitates wireless communication between access network 12 and one or more access terminals, such as access terminal 14. In particular, BTS 20 may radiate to define one or more wireless coverage areas, such as a cell and/or cell sectors. Within each of its coverage areas, BTS 20 may provide one or more wireless links, such as wireless link 28, over which access terminal 14 may communicate with BTS 20. BTS 20 may also control aspects of wireless communication with access terminal 14, such as aspects of connection establishment, handoff, and/or power control for instance. BTS 20 may perform other functions as well.

Wireless link 28 may carry communications between access network 12 and access terminal 14 according to any of a variety of protocols, including CDMA, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, or other protocols now known or later developed. Further, wireless link 28 may be divided into a forward link for carrying communications from access network 12 to the one or more access terminals and a reverse link for carrying communications from the one or more access terminals to access network 12. In turn, the forward link and the reverse link may be divided into a plurality of channels using any mechanism now known or later developed, including code division multiplexing, time division multiplexing, and/or frequency division multiplexing for instance.

For purposes of illustration only, the embodiments herein will be described by way of example with wireless link 28 carrying communications according to a CDMA protocol, and in particular IS-2000 (also known as 1xRTT). According to IS-2000, wireless link 28 may be identified by its carrier frequency and a unique pseudonoise offset ("PN offset") that distinguishes wireless link 28 from other wireless links provided by access network 12. Further, according to IS-2000, wireless link 28 may include a forward link that is code division multiplexed via Walsh codes into various forward channels for carrying communications from access network 12 to one or more access terminals, such as a forward pilot channel, a forward sync channel, forward control channels (e.g., one or more forward paging channels, one or more forward common control channels, and/or a forward broadcast control channel), and one or more forward traffic channels (e.g., each of which may include a forward power control sub-channel). Further yet, according to IS-2000, wireless link 28 may include a reverse link that is code division multiplexed via Walsh codes into various reverse channels for carrying communications from one or more access terminals to access network 12, such as one or more reverse access channels, one or more reverse pilot channels (e.g., each of which may include a reverse power control sub-channel), and one or more reverse traffic channels.

Referring again to FIG. 1, access network 12 may also include at least one base station controller (BSC), such as BSC 22, to which BTS 20 couples. (Although FIG. 1 depicts access network 12 as including one BSC, it should be understood that access network 12 may include more than one BSC, in which case each BSC may couple to a subset of the BTSs in access network 12. Further, although BSC 22 is depicted as separate entity from BTS 20, it should be understood that BSC 22 may be integrated together in whole or in part with BTS 20. Further yet, BSC 22 and BTSs 20 may together be referred to as a "base station.") BSC 22 may control aspects of BTS 20 as well as aspects of wireless communication with access terminal 14, such as aspects of connection establishment, handoff, and/or power control for instance. BSC 22 may perform other functions as well.

Further, access network 12 may include at least one mobile switching center (MSC), such as MSC 24, to which BSC 22 couples. (Although FIG. 1 depicts access network 12 as including one MSC, it should be understood that access network 12 may include more than one MSC, in which case each MSC may couple to a subset of the BSCs in access network 12.) As shown, MSC 24 may provide connectivity with circuit-switched network 16. Further, MSC 24 may control aspects of BTSs 20a-b and/or BSC 22 as well as aspects of wireless communication with access terminal 14, such as aspects of connection establishment, handoff, and/or power control for instance. MSC 24 may perform other functions as well.

Further yet, access network 12 may include at least one packet data serving node (PDSN), such as PDSN 26, to which BSC 22 couples. (Although FIG. 1 depicts access network 12 as including one PDSN, it should be understood that access network 12 may include more than one PDSN, in which case each PDSN may couple to a subset of the BSCs in access network 12.) As shown, PDSN 26 may provide connectivity with packet-switched network 16. PDSN 26 may perform other functions as well.

Access terminal 14 may be any device configured to receive wireless service from access network 12. By way of example only, access terminal 14 may take the form of a cellular telephone, a computer (e.g., a desktop, laptop, tablet, netbook, etc.), a personal digital assistant (PDA), or a personal navigation device (PND). Other examples are possible as well.

II. Current Power-Control Process

In the example communication system 10 depicted in FIG. 1, access network 12 and access terminal 14 may engage in a power-control process to control the transmission power for a given communication session on wireless link 28. In particular, access network 12 and access terminal 14 may engage in a reverse power-control process to control the reverse transmission power at which access terminal 14 sends bearer data for the given communication session on an established reverse traffic channel of wireless link 28 (i.e., the reverse traffic power for the given communication session). Similarly, access terminal 14 and access network 12 may engage in a forward power-control process to control the forward transmission power at which access network 12 sends data for the given communication session on an established forward traffic channel of wireless link 28 (i.e., the forward traffic power for the given communication session). For purposes of illustration only, the embodiments herein will be described by way of example with reference to a reverse power-control process, but it should be understood that similar techniques may apply to a forward power-control process as well.

According to an example IS-2000 reverse power-control process, access network 12 may send a series of power control commands (PCCs) directed to access terminal 14 at a predefined PCC transmission rate (e.g., 800 PCCs/second) on the established forward traffic channel of wireless link 28. To facilitate sending each such PCC, access network 12 may first determine a quality at which the established reverse traffic channel of wireless link 28 is carrying the given communication session (i.e., a reverse-channel quality) and compare the determined reverse-channel quality to a threshold reverse-channel quality. Based on that comparison, access network 12 may then decide to send (a) a "power up" PCC that instructs access terminal 14 to increase its reverse traffic power for the given communication session on wireless link 28 by a given increment value (e.g., 1 dB) if the determined reverse-channel quality is less than the threshold reverse-channel quality (which indicates that access network 12 is detecting a lower reverse-channel quality) or (b) a "power down" PCC that instructs access terminal 14 to decrease its reverse traffic power for the given communication session on wireless link 28 by a given decrement value (e.g., 1 dB) if the measured reverse-channel quality is greater than the threshold reverse-channel quality (which indicates that access network 12 is detecting a higher reverse-channel quality).

As access network 12 sends the series of PCCs directed to access terminal 14 on the established forward traffic channel of wireless link 28, access terminal 14 may receive the series of PCCs from access network 12 on the established forward traffic channel of wireless link 28. In response to each PCC received from access network 12 on wireless link 28, access terminal 14 may then responsively adjust its reverse traffic power on wireless link 28 in accordance with the PCC. For instance, access terminal 14 may increase its reverse traffic power on wireless link 28 by the given increment value in response to receiving a "power up" PCC from access network 12 and decrease its reverse traffic power on wireless link 28 by the given decrement value in response to receiving a "power down" PCC from access network 12. Accordingly, during this reverse power-control process, access terminal 14 may continually adjust its reverse traffic power for the given communication session on wireless link 28.

As noted above, however, access terminal 14 may fail to receive some PCCs sent by access network 12 (i.e., the PCC receipt rate of access terminal 14 may be less than the PCC transmission rate of access network 12) due to poor forward-channel quality or other factors. This failure to receive some PCCs sent by access network 12 may in turn result in access terminal 14 failing to adjust its reverse transmission power in close enough alignment with the expectations of access network 12, which may lead to various negative consequences. For example, if access terminal 14 fails to receive a number of "power up" PCCs from access network 12—and thus fails to increase its reverse transmission power accordingly—access terminal 14 may be transmitting bearer data for the given communication session at an unexpectedly low reverse power level that may degrade the quality of the given communication session. As another example, if access terminal 14 fails to receive a number of "power down" PCCs from access network 12—and thus fails to decrease its reverse transmission power accordingly—access terminal 14 may be transmitting bearer data for the given communication session at an unexpectedly high reverse power level that may consume additional power at access terminal 14 and introduce additional interference on the wireless links provided by access network 12.

Accordingly, a power-control process that reduces the likelihood of access terminal 14 failing to adjust its reverse transmission power in close enough alignment with the expectations of access network 12 is desirable.

III. Exemplary Power-Control Process

Figure 2:
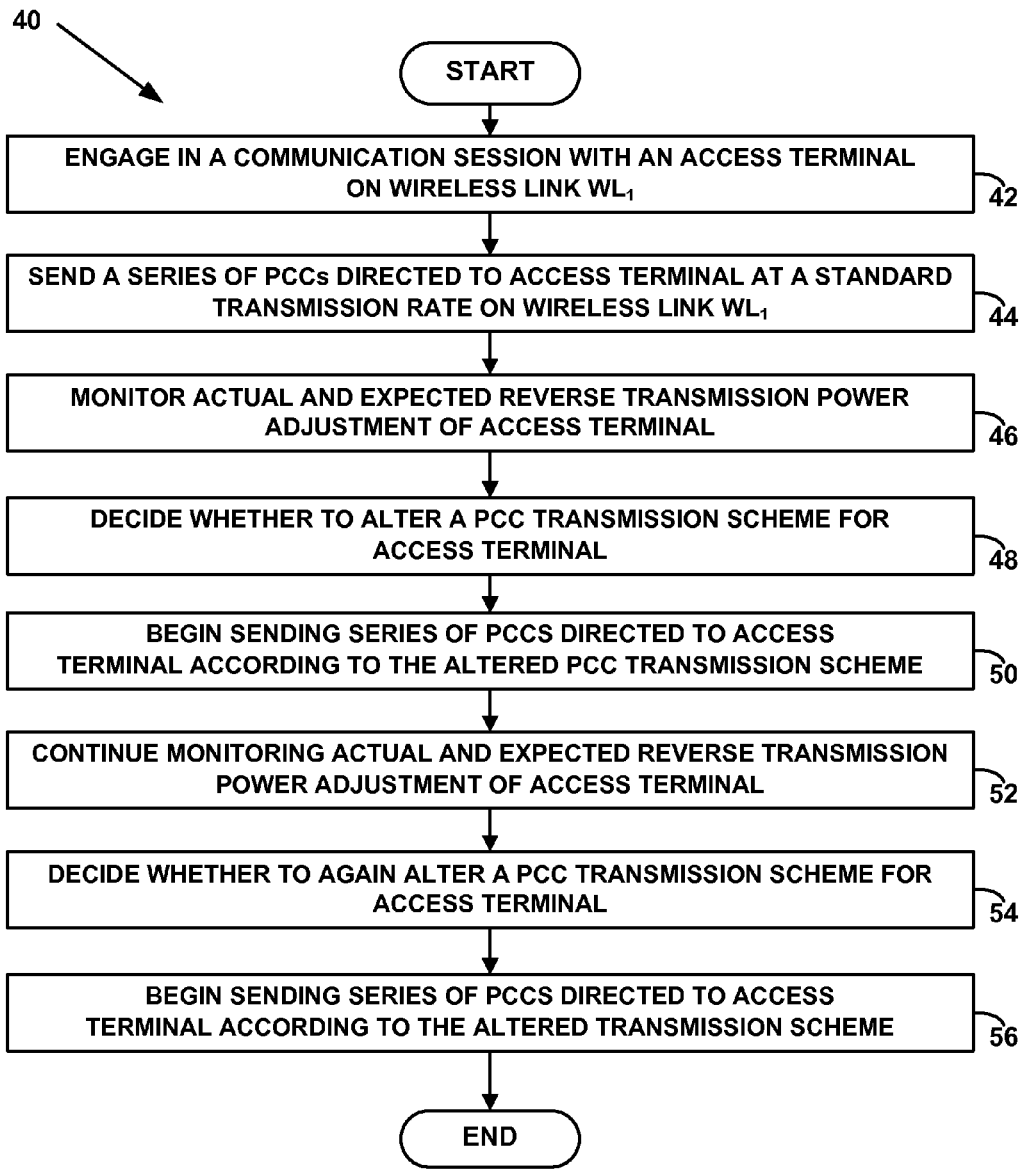
FIG. 2 is a simplified flow chart depicting an exemplary embodiment of a disclosed power-control process.

FIG. 2 is a flow chart depicting an exemplary embodiment of such a power-control process 40. For purposes of illustration, exemplary process 40 will be described with reference to access network 12 sending PCCs directed to access terminal 14, to control the reverse traffic power of access terminal 14. It should be understood, however, that exemplary process 40 may be applicable to any configuration in which a power-controlling entity is sending PCCs directed to a power-controlled entity.

As shown in FIG. 2, exemplary process 40 begins at step 42 with access network 12 and access terminal 14 engaging in a given communication session on wireless link 28. While engaging in the given communication session on wireless link 28, access network 12 may send forward communication session data to access terminal 14 on an established forward traffic channel of wireless link 28 and access terminal 14 may send reverse communication session data to access network 12 on an established reverse traffic channel of wireless link 28.

At step 44, while engaging in the given communication session on wireless link 28, access network 12 may be sending a series of PCCs directed to access terminal 14 at a current transmission rate on wireless link 28, with each such PCC instructing a current transmission-power adjustment value. (As used herein, the phrase "current transmission rate" means any rate at which access network 12 is sending PCCs directed to access terminal 14 before deciding to adjust the transmission rate according to the techniques described herein). For example, BTS 20 may be sending a series of PCCs directed to access terminal 14 at a current transmission rate of 800 PCCs/second on the established forward traffic channel of wireless link 28, with each such PCC instructing a 1 dB transmission-power adjustment. Other examples are possible as well.

While access network 12 is sending the series of PCCs directed to access terminal 14 at the current transmission rate on wireless link 28, access terminal 14 may receive PCCs in the series of PCCs sent by access network 12 on wireless link 28. In response to each PCC received from access network 12 on wireless link 28, access terminal 14 may then responsively adjust its reverse traffic power on wireless link 28 in accordance with the PCC. Due to poor forward-channel quality or other factors, however, access terminal 14 may also fail to receive some PCCs in the series of PCC sent by access network 12 (i.e., the PCC receipt rate of access terminal 14 may be lower than the PCC transmission rate). This lower receipt rate may result in access terminal 14 failing to adjust its reverse transmission power in close enough alignment with the expectations of access network 12.

At step 46, while access network 12 is sending the series of PCCs directed to access terminal 14 at the current transmission rate on wireless link 28, access network 12 may monitor an actual and expected reverse-transmission-power adjustment of access terminal 14. Access network 12 may perform this monitoring using various techniques.

According to one technique, access network 12 may perform this monitoring by regularly determining an actual and expected reverse-transmission-power adjustment of access terminal 14 over the course of a predefined time window (e.g., the previous 12.5 ms). Access network 12 may determine an actual reverse-transmission-power adjustment of access terminal 14 over the course of a predefined time window in various manners, such as by measuring a reverse transmission power of access terminal 14 (e.g., the chip energy to total RF energy ($E_c/I_0$) of the reverse pilot channel) at the beginning and end of the predefined time window and then calculating the difference between the measured reverse transmission powers. Further, access network 12 may determine an expected reverse-transmission-power adjustment of access terminal 14 over the course of the predefined time window in various manners, such as by determining a number of "power up" PCCs and "power down" PCCs sent at the current transmission rate over the course of the predefined time window, calculating a difference between the determined numbers, and then multiplying that difference by the amount of power adjustment instructed by a PCC (e.g., 1 dB). Other examples are possible as well.

At step 48, based on the monitored actual and expected reverse-transmission-power adjustment of access terminal 14, access network 12 may decide whether to alter the transmission scheme for sending PCCs directed to access terminal 14 to bring the actual and expected reverse-transmission-power adjustment of access terminal 14 into closer alignment. Access network 12 may carry out this decision using various techniques.

According to one technique, access network 12 may carry out this decision based on a comparison between the actual and expected reverse-transmission-power adjustment of access terminal 14 over the course of a given time window (e.g., the previous 12.5 ms). For instance, based on such a comparison, access network 12 may determine that the actual and expected reverse-transmission-power adjustment differ by a threshold extent and responsively decide to alter the PCC transmission scheme for access terminal 14. This threshold extent may take various forms. In one example, the threshold extent may be an actual reverse power increase that is a threshold amount (e.g., 5 dB) less than the expected reverse power increase. In another example, the threshold extent may be an actual reverse power decrease that is a threshold amount (e.g., 5 dB) less than the expected reverse power decrease. In yet another example, the threshold extent may be any actual reverse power increase relative to any expected reverse power decrease. In still another example, the threshold extent may be any actual reverse power decrease relative to any expected reverse power increase. Other examples are possible as well.

According to another technique, access network 12 may carry out this decision based on (1) a first comparison between the expected reverse-transmission-power adjustment of access terminal 14 over the course of a given time window (e.g., the previous 12.5 ms) and a first threshold value and (2) a second comparison between the actual reverse-transmission-power adjustment of access terminal 14 over the course of a given time window and a second threshold value. For instance, access network 12 may first compare the expected reverse-transmission-power adjustment of access terminal 14 over the course of a given time window to a first threshold value (e.g., an increase or decrease of 7.5 dB) and thereby determine whether the expected reverse-transmission-power adjustment is greater than the first threshold value (and thus whether access network 12 instructed access terminal 14 to make a significant reverse-transmission-power adjustment). If so, access network 12 may then compare the actual reverse-transmission-power adjustment of access terminal 14 over the course of the given time window to a second threshold value (e.g., an increase or decrease of 2.5 dB) and thereby determine whether the expected reverse-transmission-power adjustment is less than the second threshold value (and thus whether access terminal 14 made an insignificant reverse-transmission-power adjustment). If so, access network 12 may then decide to alter the PCC transmission scheme for access terminal 14.

Access network 12 may alter the PCC transmission scheme for access terminal 14 to bring the actual and expected reverse-transmission-power adjustment of access terminal 14 into closer alignment using various techniques, which it may implement separately or together. In a first aspect of exemplary process 40, access network 12 may alter the PCC transmission scheme for access terminal 14 by increasing the PCC transmission rate for access terminal 14. In particular, if the monitored actual and expected reverse-transmission-power adjustment of access terminal 14 indicates that access terminal 14 is not adjusting its reverse transmission power in close enough alignment with the expectations of access network 12, access network 12 may decide to increase the PCC transmission rate for access terminal 14 from the current transmission rate to an increased transmission rate (unless the PCC transmission rate for access terminal 14 is already at a predefined maximum rate).

In a second aspect of exemplary process 40, access network 12 may alter the PCC transmission scheme for access terminal 14 by increasing the transmission-power adjustment value (i.e., the increment and/or decrement values) instructed by PCCs directed to access terminal 14. In particular, if the monitored actual and expected reverse-transmission-power adjustment of access terminal 14 indicates that access terminal 14 is not adjusting its reverse transmission power in close enough alignment with the expectations of access network 12, access network 12 may decide to increase the transmission-power adjustment value for access terminal 14 from a current adjustment value to an increased adjustment value (unless the transmission-power adjustment value for access terminal 14 is already at a predefined maximum adjustment value).

At step 50, in response to deciding to alter the PCC transmission scheme for access terminal 14, access network 12 may then begin sending the series of PCCs directed to access terminal 14 according to the altered PCC transmission scheme. For example, access network 12 may begin sending the series of PCCs directed to access terminal 14 at an increased transmission rate (e.g., 1000 PCCs/second). As another example, access network 12 may begin sending the series of PCCs directed to access terminal 14, with each PCC instructing an increased transmission-power adjustment (e.g., 1.25 dB). Other examples are possible as well.

While access network 12 is sending the series of PCCs directed to access terminal 14 on wireless link 28 according to the altered PCC transmission scheme, access terminal 14 may receive PCCs in the series of PCCs sent by access network 12 on wireless link 28. In response to each PCC received from access network 12 on wireless link 28, access terminal 14 may then responsively adjust its reverse traffic power on wireless link 28 in accordance with the PCC. Due to poor forward-channel quality or other factors, access terminal 14 may also still fail to receive some PCCs in the series of PCC sent by access network 12 (i.e., the PCC receipt rate of access terminal 14 may be still be lower than the PCC transmission rate). Being that access network 12 is sending the series of PCCs directed to access terminal 14 at the increased transmission rate and/or with an increased transmission-power adjustment value, however, access terminal 14 may begin adjusting its reverse transmission power in closer alignment with the expectations of access network 12. As a result, exemplary process 40 may avoid the negative consequences described above.

At step 52, while access network 12 is sending the series of PCCs directed to access terminal 14 on wireless link 28 according to the altered PCC transmission scheme, access network 12 may continue monitoring the actual and expected reverse-transmission-power adjustment of access terminal 14. Access network 12 may perform this monitoring using various techniques, including techniques similar to those described above with reference to step 46.

At step 54, based on the monitored actual and expected reverse-transmission-power adjustment of access terminal 14, access network 12 may decide whether to alter the PCC transmission scheme for access terminal 14 to conserve network resources. Access network 12 may carry out this decision using various techniques, including techniques similar to those described above with reference to step 48.

According to one technique, access network 12 may carry out this decision based on a comparison between the actual and expected reverse-transmission-power adjustment of access terminal 14 over the course of a given time window (e.g., the previous 12.5 ms). For instance, based on such a comparison, access network 12 may determine that the actual and expected reverse-transmission-power adjustment does not differ by a threshold extent and responsively decide to alter the PCC transmission scheme for access terminal 14. In one example, this threshold extent may be substantially similar the above-described threshold extent for deciding whether to increase the PCC transmission rate. In another example, this threshold extent may be smaller than the above-described threshold extent for deciding whether to increase the PCC transmission rate, thus requiring the actual and expected reverse-transmission-power adjustment to be in closer alignment before deciding the decrease the PCC transmission rate back to the current transmission rate (or perhaps some other decreased transmission rate).

Access network 12 may alter the PCC transmission scheme for access terminal 14 to bring the actual and expected reverse-transmission-power adjustment of access terminal 14 into closer alignment using various techniques, which it may implement separately or together. In a first aspect of exemplary process 40, access network 12 may alter the PCC transmission scheme for access terminal 14 by decreasing the PCC transmission rate for access terminal 14. In particular, if the monitored actual and expected reverse-transmission-power adjustment of access terminal 14 indicates that access terminal 14 is adjusting its reverse transmission power in close alignment with the expectations of access network 12, access network 12 may decide to decrease the PCC transmission rate for access terminal 14 back to the current transmission rate (or perhaps some other decreased transmission rate).

In a second aspect of exemplary process 40, access network 12 may alter the PCC transmission scheme for access terminal 14 by decreasing the transmission-power adjustment value (i.e., the increment and/or decrement values) instructed by PCCs directed to access terminal 14. In particular, if the monitored actual and expected reverse-transmission-power adjustment of access terminal 14 indicates that access terminal 14 is adjusting its reverse transmission power in close alignment with the expectations of access network 12, access network 12 may decide to decrease the transmission-power adjustment value for access terminal 14 from the increased adjustment value back to the current adjustment value (or perhaps some other decreased adjustment value).

At step 56, in response to deciding to again alter the PCC transmission scheme for access terminal 14, access network 12 may begin sending the series of PCCs directed to access terminal 14 according to the altered PCC transmission scheme for access terminal 14. For example, BTS 20 may begin sending the series of PCCs directed to access terminal 14 at the current transmission rate. As another example, access network 12 may begin sending the series of PCCs directed to access terminal 14, with each PCC instructing the current transmission-power adjustment value (e.g., 1 dB). Other examples are possible as well.

In a similar manner, access network 12 may continue altering its PCC transmission scheme for access terminal 14 based on the actual and expected reverse-transmission-power adjustment of access terminal 14. In doing so, access network 12 may keep the reverse-transmission-power adjustment of access terminal 14 in closer alignment with the expectations of access network 12 and thereby avoid the negative consequences that could result from misalignment of the actual and expected reverse-transmission-power adjustment of access terminal 14.

IV. Exemplary Base Station

Figure 3:
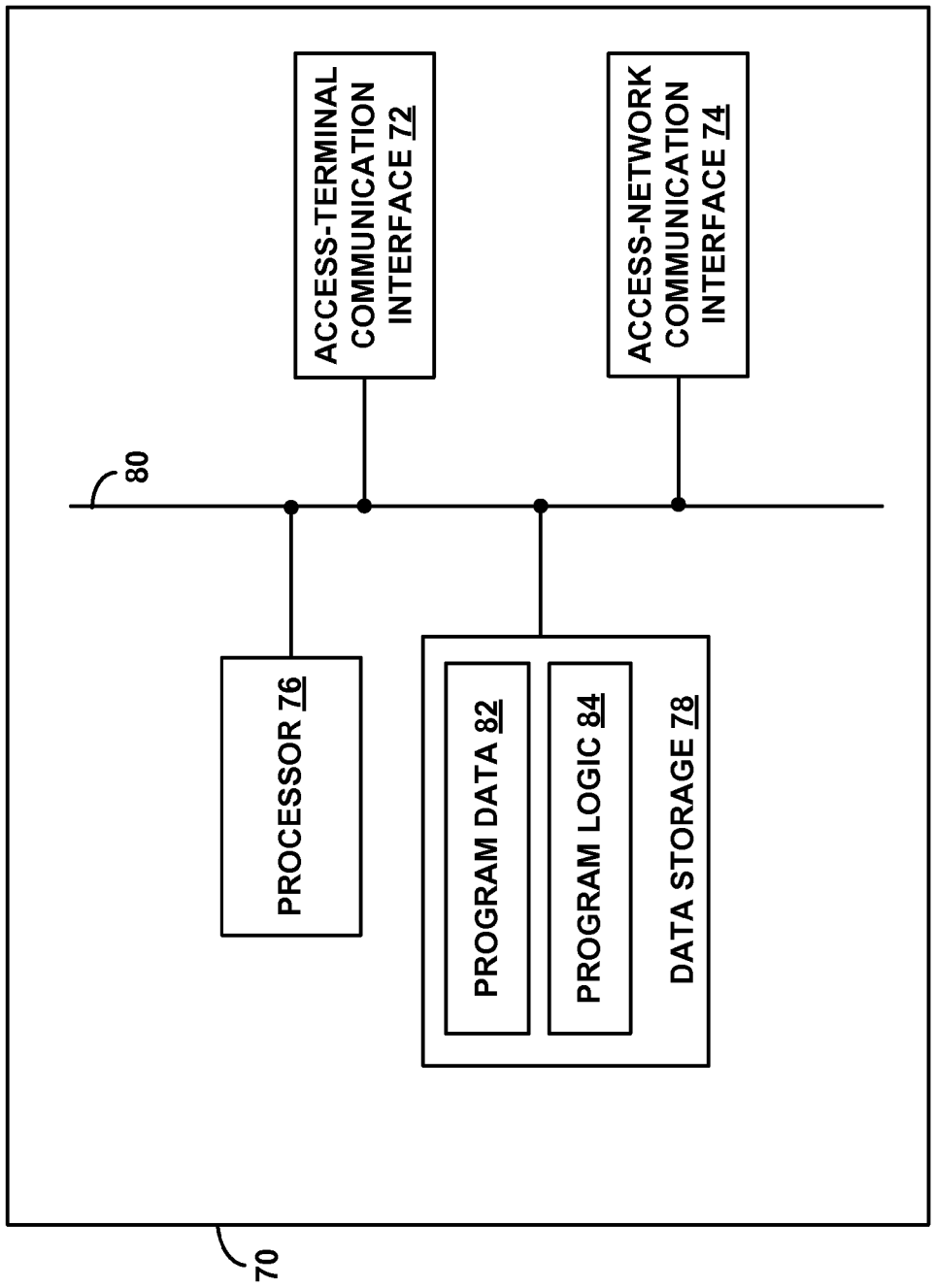
FIG. 3 is a simplified block diagram showing functional components of an exemplary base station capable of carrying out features of the exemplary embodiment of the disclosed power-control process.

FIG. 3 is a simplified block diagram showing functional components of an exemplary base station 70 that is configured to carry out features of power-control process 40. (It should be understood, however, that one or more other access network entities may additionally or alternatively be capable carrying out features of the exemplary power-control process). As shown in FIG. 3, exemplary base station 70 may include an access-terminal communication interface 72, an access-network communication interface 74, a processor 76, and data storage 78, all linked together via a system bus, network, or other connection mechanism 80. Base station 70 may include other components as well.

Referring to FIG. 3, access-terminal communication interface 72 may radiate to define one or more wireless coverage areas and provide one or more wireless links, such as wireless link 28, over which access terminals may communicate with base station 70. As such, access-terminal communication interface 72 may include one or more antenna structures arranged in various ways (e.g., one or more directional or sectored antennas). Additionally, access-terminal communication interface 72 may include at least one power amplifier for each provided wireless link. Each such power amplifier may enable base station 70 to adjust both its total transmission power on each forward link and its transmission power on each respective channel of each forward link. Each such power amplifier may also define practical limits on the maximum and minimum power levels at which base station 70 can transmit on each forward link and each respective channel of each forward link. Other configurations are possible as well.

Access-network communication interface 74 may be configured to communicatively couple base station 70 to various other access network entities, such as one or more MSCs and/or one or more PDSNs for instance. To facilitate these couplings, access-network communication interface 74 may take various forms. For example, access-network communication interface 74 may take the form of an Ethernet interface, a serial bus interface (e.g., Firewire, USB 2.0, etc.), a chipset and antenna adapted to facilitate wireless communication according a desired protocol, and/or any other interface that provides for wired and/or wireless communication with an access network entity. Access-network communication interface 74 may also include some combination of different interfaces types. Other configurations are possible as well.

Processor 76 may comprise one or more processor components, such as general-purpose processors (e.g., a microprocessor), application-specific processors (e.g., as application-specific integrated circuit (ASIC) or digital signal processor (DSP)), programmable logic devices (e.g., a field programmable gate array (FPGA)), or other processor components now known or later developed. Data storage 78, in turn, may comprise one or more non-transitory computer-readable storage mediums, such as volatile data storage mediums (e.g., random access memory (RAM), registers, and/or cache) and/or non-volatile data storage mediums (e.g., read only memory (ROM), a hard disk drive, a solid state drive, flash memory, and/or an optical storage device). Some data storage mediums may be integrated in whole or in part with processor 76. Further, some data storage mediums may be external to and/or removable from base station 70 and may interface with base station 70 in various manners. As shown, data storage 78 may contain (i) program data 82 and (ii) program logic 84, which may be maintained either separately or together within data storage 78.

Program data 82 may contain information relating to wireless links over which base station 70 may communicate with access terminals. For example, program data 82 may contain an identifier of each such wireless link (e.g., a carrier frequency and a PN offset). As another example, program data 82 may contain identifiers of forward and/or reverse channels on each such wireless link (e.g., MAC IDs and/or Walsh codes). As still another example, program data 82 may contain data defining each coverage area served by each such wireless link (e.g., indications of the shape, size, and/or location of each coverage area). Other examples are possible as well.

Further, program data 82 may contain information relating to one or more access terminals being served by base station 70. For example, program data 82 may contain an identifier of each such access terminal. As another example, program data 82 may contain an identifier of a wireless link serving each such access terminal. As yet another example, program data 82 may contain identifiers of any forward and/or reverse channels established with each such access terminal (e.g., MAC IDs and/or Walsh codes). Other examples are possible as well.

Further yet, program data 82 may contain information relating to each active communication session between base station 70 and an active access terminal. For example, program data 82 may contain data defining each such active communication session, including identifiers of the access terminal, the access network entities, the wireless link(s), and/or the forward and reverse channel(s) involved in the active communication session. As another example, for each such active communication session, program data 82 may contain an indicator of the transmission rate at which the access network is sending PCCs directed to the access terminal involved in the communication session. As yet another example, for each such active communication session, program data 82 may contain an indicator of a transmission-power adjustment instructed by PCCs directed to the access terminal involved in the communication session. As a further example, for each such active communication session, program data 82 may contain an indicator of the actual and expected reverse transmission power of the access terminal involved in the communication session. Other examples are possible as well.

Program logic 84 preferably comprises machine-language instructions that may be executed or interpreted by processor 76 to carry out functions in accordance with exemplary power-control process 40. For instance, program logic 84 may be executable by processor 76 to (a) engage in a given communication session with an access terminal on a given wireless link, (b) sending a series of PCCs directed to the access terminal at a first transmission rate on the given wireless link, (c) monitor an actual and expected reverse-transmission-power adjustment of the access terminal, (d) based on the monitored actual and expected reverse-transmission-power adjustment of the access terminal, decide to alter a PCC transmission scheme for the access terminal (e.g., a PCC transmission rate and/or a transmission-power adjustment value), and (e) in response to deciding to alter the PCC transmission scheme for the access terminal, begin sending the series of PCCs directed to the access terminal according to the altered PCC transmission scheme. Program logic 84 may be executable by processor 76 to carry out various other functions as well.

V. Conclusion

Exemplary embodiments have been described above. Those skilled in the art will understand, however, that changes and modifications may be made to the embodiments described without departing from the true scope and spirit of the present invention, which is defined by the claims.

We claim:
1. A method comprising:
a first entity engaging in a given communication session with a second entity on a given wireless link;
the first entity sending a series of power control commands (PCCs) directed to the second entity at a first transmission rate on the given wireless link;
the first entity monitoring an actual and expected transmission-power adjustment of the second entity;
based on a comparison between the monitored actual and expected transmission-power adjustment, the first entity deciding to alter the transmission rate at which to send PCCs directed to the second entity from the first transmission rate to a second transmission rate; and
in response to deciding to alter the transmission rate at which to send PCCs directed to the second entity, the first entity sending the series of PCCs directed to the second entity at the second transmission rate.

2. The method of claim 1, wherein monitoring the actual and expected transmission-power adjustment of the second entity comprises:

determining the actual and expected transmission-power adjustment of the second entity over the course of a predefined time window.

3. The method of claim 2, wherein determining the actual transmission-power adjustment of the second entity over the course of the predefined time window comprises:
  measuring a first transmission power of the second entity at the beginning of the predefined time window;
  measuring a second transmission power of the second entity at the end of the predefined time window; and
  calculating a difference between the first and second transmission powers.

4. The method of claim 2, wherein determining the expected transmission-power adjustment of the second entity over the course of the predefined time window comprises:
  determining a first number of "power up" PCCs directed to the second entity sent over the course of the predefined time window;
  determining a second number of "power down" PCCs directed to the second entity sent over the course of the predefined time window;
  calculating a difference between the first and second numbers; and
  multiplying the calculated difference by an amount of power adjustment instructed by a PCC.

5. The method of claim 2, wherein deciding to alter the transmission rate at which to send PCCs directed to the second entity based on the comparison between the monitored actual and expected transmission-power adjustment comprises:
  comparing the actual transmission-power adjustment of the second entity over the course the predefined time window to the expected transmission-power adjustment of the second entity over the course of the predefined time window;
  based on the comparing, determining that the actual transmission-power adjustment of the second entity over the course of the predefined time window and the expected transmission-power adjustment of the second entity over the course of the predefined time window differ by a threshold extent;
  in response to the determining, deciding to increase the transmission rate at which to send PCCs directed to the second entity.

6. The method of claim 5, wherein determining that the actual transmission-power adjustment and the expected transmission-power adjustment differ by the threshold extent comprises determining that the actual transmission-power adjustment is a threshold amount less than the expected transmission-power adjustment.

7. The method of claim 2, wherein deciding to alter the transmission rate at which to send PCCs directed to the second entity based on the comparison between the monitored actual and expected transmission-power adjustment comprises:
  comparing the actual transmission-power adjustment of the second entity over the course of the predefined time window to the expected transmission-power adjustment of the second entity over the course of the predefined time window;
  based on the comparing, determining that the actual transmission-power adjustment of the second entity over the course of the predefined time window and the expected transmission-power adjustment of the second entity over the course of the predefined time window do not differ by a threshold extent;
  in response to the determining, deciding to decrease the transmission rate at which to send PCCs directed to the second entity.

8. A method comprising:
  a first entity engaging in a given communication session with a second entity on a given wireless link;
  the first entity sending a series of power control commands (PCCs) directed to the second entity on the given wireless link, wherein each PCC instructs a transmission-power adjustment of a first value;
  the first entity monitoring an actual and expected transmission-power adjustment of the second entity;
  based on a comparison between the monitored actual and expected transmission-power adjustment, the first entity deciding to alter the transmission-power adjustment instructed by PCCs directed to the second entity from the first value to a second value; and
  in response to deciding to alter the transmission-power adjustment instructed by PCCs directed to the second entity, the first entity sending the series of PCCs directed to the second entity, wherein each PCC instructs a transmission-power adjustment of the second value.

9. The method of claim 8, wherein monitoring the actual and expected transmission-power adjustment of the second entity comprises:
  determining the actual and expected transmission-power adjustment of the second entity over the course of a predefined time window.

10. The method of claim 9, wherein determining the actual transmission-power adjustment of the second entity over the course of the predefined time window comprises:
  measuring a first transmission power of the second entity at the beginning of the predefined time window;
  measuring a second transmission power of the second entity at the end of the predefined time window; and
  calculating a difference between the first and second transmission powers.

11. The method of claim 9, wherein determining the expected transmission-power adjustment of the second entity over the course of the predefined time window comprises:
  determining a first number of "power up" PCCs directed to the second entity sent over the course of the predefined time window;
  determining a second number of "power down" PCCs directed to the second entity sent over the course of the predefined time window;
  calculating a difference between the first and second numbers; and
  multiplying the calculated difference by an amount of power adjustment instructed by a PCC.

12. The method of claim 9, wherein deciding to alter the transmission-power adjustment instructed by PCCs directed to the second entity based on the comparison between the monitored actual and expected transmission-power adjustment comprises:
  comparing the actual transmission-power adjustment of the second entity over the course of the predefined given time window to the expected transmission-power adjustment of the second entity over the course of the predefined time window;
  based on the comparing, determining that the actual transmission-power adjustment of the second entity over the course of the predefined time window and the expected transmission-power adjustment of the second entity over the course of the predefined time window differ by a threshold extent;

in response to the determining, deciding to increase the transmission-power adjustment instructed by PCCs directed to the second entity.

13. The method of claim 12, wherein determining that the actual transmission-power adjustment and the expected transmission-power adjustment differ by the threshold extent comprises determining that the actual transmission-power adjustment is a threshold amount less than the expected transmission-power adjustment.

14. The method of claim 9, wherein deciding to alter the transmission-power adjustment instructed by PCCs directed to the second entity based on the comparison between the monitored actual and expected transmission-power adjustment comprises:

comparing the actual transmission-power adjustment of the second entity over the course of the predefined time window to the expected transmission-power adjustment of the second entity over the course of the given time window;

based on the comparing, determining that the actual transmission-power adjustment of the second entity over the course of the predefined time window and the expected transmission-power adjustment of the second entity over the course of the predefined time window do not differ by a threshold extent;

in response to the determining, deciding to decrease the transmission-power adjustment instructed by PCCs directed to the second entity.

15. A base station comprising:

a first communication interface configured to provide one or more wireless links over which to communicate with one or more access terminals;

a second communication interface configured to facilitate communication with one or more access network entities;

a processor;

non-transitory data storage; and program instructions stored in the non-transitory data storage and executable by the processor to:

engage in a given communication session with an access terminal on a given wireless link;

send a series of power control commands (PCCs) directed to the access terminal at a first transmission rate on the given wireless link;

monitor an actual and expected reverse-transmission-power adjustment of the access terminal;

based on a comparison between the monitored actual and expected reverse-transmission-power adjustment of the access terminal, decide to alter the transmission rate at which to send PCCs directed to the access terminal from the first transmission rate to a second transmission rate; and in response to deciding to alter the transmission rate at which to send PCCs directed to the access terminal, send the series of PCCs directed to the access terminal at the second transmission rate.

16. A base station comprising:

a first communication interface configured to provide one or more wireless links over which to communicate with one or more access terminals;

a second communication interface configured to facilitate communication with one or more access network entities;

a processor;

non-transitory data storage; and program instructions stored in the non-transitory data storage and executable by the processor to:

engage in a given communication session with an access terminal on a given wireless link;

send a series of power control commands (PCCs) directed to the access terminal on the given wireless link, wherein each PCC instructs a transmission-power adjustment of a first value;

monitor an actual and expected reverse-transmission-power adjustment of the access terminal;

based on a comparison between the monitored actual and expected reverse-transmission-power adjustment of the access terminal, decide to alter the transmission-power adjustment instructed by PCCs directed to the access terminal from the first value to a second value; and in response to deciding to alter the transmission-power adjustment instructed by PCCs directed to the access terminal, send the series of PCCs directed to the access terminal, wherein each PCC instructs a transmission-power adjustment of the second value.

* * * * *